(12) United States Patent
Tayama

(10) Patent No.: US 9,597,758 B2
(45) Date of Patent: Mar. 21, 2017

(54) WORK SUPPORT APPARATUS

(71) Applicant: HIRATA CORPORATION, Shinagawa-ku (JP)

(72) Inventor: Tatsuya Tayama, Shinagawa-ku (JP)

(73) Assignee: HIRATA CORPORATION, Shinagawa-Ku, Tokyo (JP)

( * ) Notice: Subject to any disclaimer, the term of this patent is extended or adjusted under 35 U.S.C. 154(b) by 371 days.

(21) Appl. No.: 14/136,535

(22) Filed: Dec. 20, 2013

(65) Prior Publication Data

US 2014/0103592 A1 Apr. 17, 2014

Related U.S. Application Data

(63) Continuation of application No. PCT/JP2011/003585, filed on Jun. 23, 2011.

(51) Int. Cl.
| | |
|---|---|
| *B23Q 3/04* | (2006.01) |
| *B25B 11/00* | (2006.01) |
| *B23Q 1/54* | (2006.01) |
| *B23Q 3/02* | (2006.01) |

(52) U.S. Cl.
CPC ............ *B23Q 3/04* (2013.01); *B23Q 1/5406* (2013.01); *B23Q 3/02* (2013.01); *B25B 11/00* (2013.01)

(58) Field of Classification Search
CPC .......... B23Q 3/04; B23Q 1/5406; B23Q 3/02; B25B 11/00; F16C 13/04; F16C 19/507; F16C 19/50; B23K 37/0538
USPC ....... 269/55, 74, 287, 76, 69, 296; 74/570.3, 74/50
See application file for complete search history.

(56) References Cited

U.S. PATENT DOCUMENTS

| | | | | | |
|---|---|---|---|---|---|
| 2,320,079 | A | * | 5/1943 | Hartwig | B23K 37/0452 269/287 |
| 2,991,994 | A | * | 7/1961 | Kulp | B25H 1/0007 269/141 |
| 3,521,875 | A | * | 7/1970 | Kapelsohn | B23K 37/0452 269/287 |

(Continued)

FOREIGN PATENT DOCUMENTS

| | | |
|---|---|---|
| CN | 201833197 U | 5/2011 |
| JP | 7-041158 A | 2/1995 |

(Continued)

OTHER PUBLICATIONS

Hirata Engine Assembly Pallet at (http://www.hirata.co.jp/en/business/automotive.html).*

(Continued)

*Primary Examiner* — Larry E Waggle, Jr.
*Assistant Examiner* — Mahdi H Nejad
(74) *Attorney, Agent, or Firm* — Buchanan Ingersoll & Rooney PC

(57) ABSTRACT

A work support apparatus according to the present invention includes a base unit, a holding unit stands on the base unit and holds a work in a cantilevered state, and a tilt mechanism that makes the holding unit pivot with respect to the base unit. The holding unit includes a holding portion holding the work in a state in which a side portion of the work on the holding unit side is exposed. The tilt mechanism is an arcuate slide mechanism including an arcuate shape portion with respect to a virtual horizontal line as the center, and an abutting portion abutting against the arcuate shape portion.

13 Claims, 6 Drawing Sheets

(56) References Cited

U.S. PATENT DOCUMENTS

| | | | | |
|---|---|---|---|---|
| 4,039,115 A * | 8/1977 | Randolph | B23K 37/0538 | 228/44.5 |
| 4,073,483 A * | 2/1978 | Smith | B23K 37/0426 | 269/127 |
| 4,239,196 A * | 12/1980 | Hanger | B25H 1/0007 | 269/17 |
| 4,437,709 A * | 3/1984 | Linderman | E21B 19/008 | 384/617 |
| 4,533,127 A * | 8/1985 | Hawkins | B66C 23/48 | 269/17 |
| 4,552,508 A * | 11/1985 | Reid | F16C 13/04 | 384/549 |
| 4,705,264 A * | 11/1987 | Hawkins | B66C 23/485 | 269/17 |
| 4,813,843 A * | 3/1989 | Gilmour | B66F 7/22 | 254/94 |
| 4,893,802 A * | 1/1990 | Lin | B23Q 1/28 | 269/74 |
| 5,127,638 A * | 7/1992 | Kent | B62B 3/04 | 254/133 R |
| 5,473,657 A * | 12/1995 | McKenna | A61B 6/035 | 378/15 |
| 5,618,228 A * | 4/1997 | Anderson | B60B 29/00 | 248/289.11 |
| 5,709,482 A * | 1/1998 | Lutz | F16C 35/02 | 384/434 |
| 5,897,100 A * | 4/1999 | Napier | B25H 1/0007 | 254/124 |
| 5,904,347 A * | 5/1999 | Lin | B23K 37/0452 | 269/296 |
| 5,975,512 A * | 11/1999 | Lin | B23Q 7/02 | 269/296 |
| 6,491,293 B1 * | 12/2002 | Brewer | B25B 11/02 | 269/17 |
| 6,619,640 B1 * | 9/2003 | Ploski | B23Q 1/52 | 269/17 |
| 6,860,800 B1 * | 3/2005 | Maurer | B23Q 7/02 | 269/289 MR |
| 7,837,084 B2 * | 11/2010 | Simmons | B23K 37/0443 | 219/159 |
| 7,878,753 B2 * | 2/2011 | Kielian | B66C 1/20 | 269/17 |
| 8,104,588 B2 * | 1/2012 | Curlee | B62H 3/08 | 188/32 |
| 8,418,340 B2 * | 4/2013 | Koehnen | B25B 5/003 | 248/122.1 |
| 8,534,986 B2 * | 9/2013 | Borer | F04D 29/624 | 29/281.1 |
| 8,662,757 B2 * | 3/2014 | Zhang | A61B 6/03 | 384/549 |
| 8,950,648 B2 * | 2/2015 | Simmons | B23K 37/0533 | 219/159 |
| 9,131,647 B1 * | 9/2015 | Lindberg | A01G 23/003 | |
| 9,180,577 B2 * | 11/2015 | Heath | B25B 11/02 | |
| 9,327,374 B1 * | 5/2016 | McCulloch | B23Q 3/062 | |
| 2004/0055147 A1 * | 3/2004 | Ghuman | B23K 37/0426 | 29/711 |
| 2004/0062343 A1 * | 4/2004 | Brunnett | A61B 6/035 | 378/15 |
| 2005/0102814 A1 * | 5/2005 | Anderson | B29C 33/68 | 29/455.1 |
| 2005/0212191 A1 * | 9/2005 | McKelvie | B60S 13/00 | 269/17 |
| 2008/0315476 A1 * | 12/2008 | Akhavan-Malayeri | B23Q 1/5437 | 269/20 |
| 2010/0171254 A1 * | 7/2010 | Rolle | B23K 37/0452 | 269/57 |
| 2010/0192346 A1 * | 8/2010 | Simmons | B23K 31/12 | 29/281.1 |
| 2010/0308594 A1 * | 12/2010 | Numajiri | F16C 19/38 | 290/55 |
| 2010/0325888 A1 * | 12/2010 | Hawes | F04B 53/22 | 29/888.021 |
| 2011/0243645 A1 * | 10/2011 | Ichihashi | B25J 9/0006 | 403/82 |
| 2012/0049429 A1 * | 3/2012 | Lindberg | A01G 23/003 | 269/17 |
| 2012/0174371 A1 * | 7/2012 | Koehnen | B25B 5/003 | 29/428 |
| 2012/0279064 A1 * | 11/2012 | Reinhardt | F01D 25/285 | 29/888 |
| 2012/0279949 A1 * | 11/2012 | Simmons | B23K 37/0533 | 219/159 |
| 2014/0035216 A1 * | 1/2014 | Lee | B23Q 3/02 | 269/309 |
| 2014/0259663 A1 * | 9/2014 | Scelsi | B25H 1/0007 | 29/888.01 |
| 2014/0301680 A1 * | 10/2014 | Tecza | F04D 29/057 | 384/101 |
| 2015/0165638 A1 * | 6/2015 | Martin | B27B 17/0075 | 269/257 |
| 2015/0192104 A1 * | 7/2015 | Lulker | F03D 1/005 | 206/493 |
| 2015/0217413 A1 * | 8/2015 | Simmons | B23K 37/0533 | 228/101 |
| 2016/0016267 A1 * | 1/2016 | Beatty | B23K 37/0452 | 29/559 |

FOREIGN PATENT DOCUMENTS

| | | | |
|---|---|---|---|
| JP | 8-318448 A | | 12/1996 |
| JP | 11-291138 A | | 10/1999 |
| JP | 3091400 | * | 10/2002 |
| JP | 3091400 U | * | 10/2002 |
| JP | 3091400 U | | 10/2002 |
| JP | 2006-263860 A | | 10/2006 |
| JP | 2007-203385 A | | 8/2007 |
| JP | 2009-061515 A | | 3/2009 |
| JP | 2010-155307 A | | 7/2010 |
| WO | WO 2015/063307 | * | 5/2015 |

OTHER PUBLICATIONS

Office Action issued on May 6, 2015, by the Chinese Patent Office in corresponding Chinese Patent Application No. 201180071820.4. (6 pages).

International Search Report (PCT/ISA/210) mailed on Aug. 16, 2011, by the Japanese Patent Office as the International Searching Authority for International Application No. PCT/JP2011/003585.

Written Opinion (PCT/ISA/237) mailed on Aug. 16, 2011, by the Japanese Patent Office as the International Searching Authority for International Application No. PCT/JP2011/003585.

* cited by examiner

F I G. 5
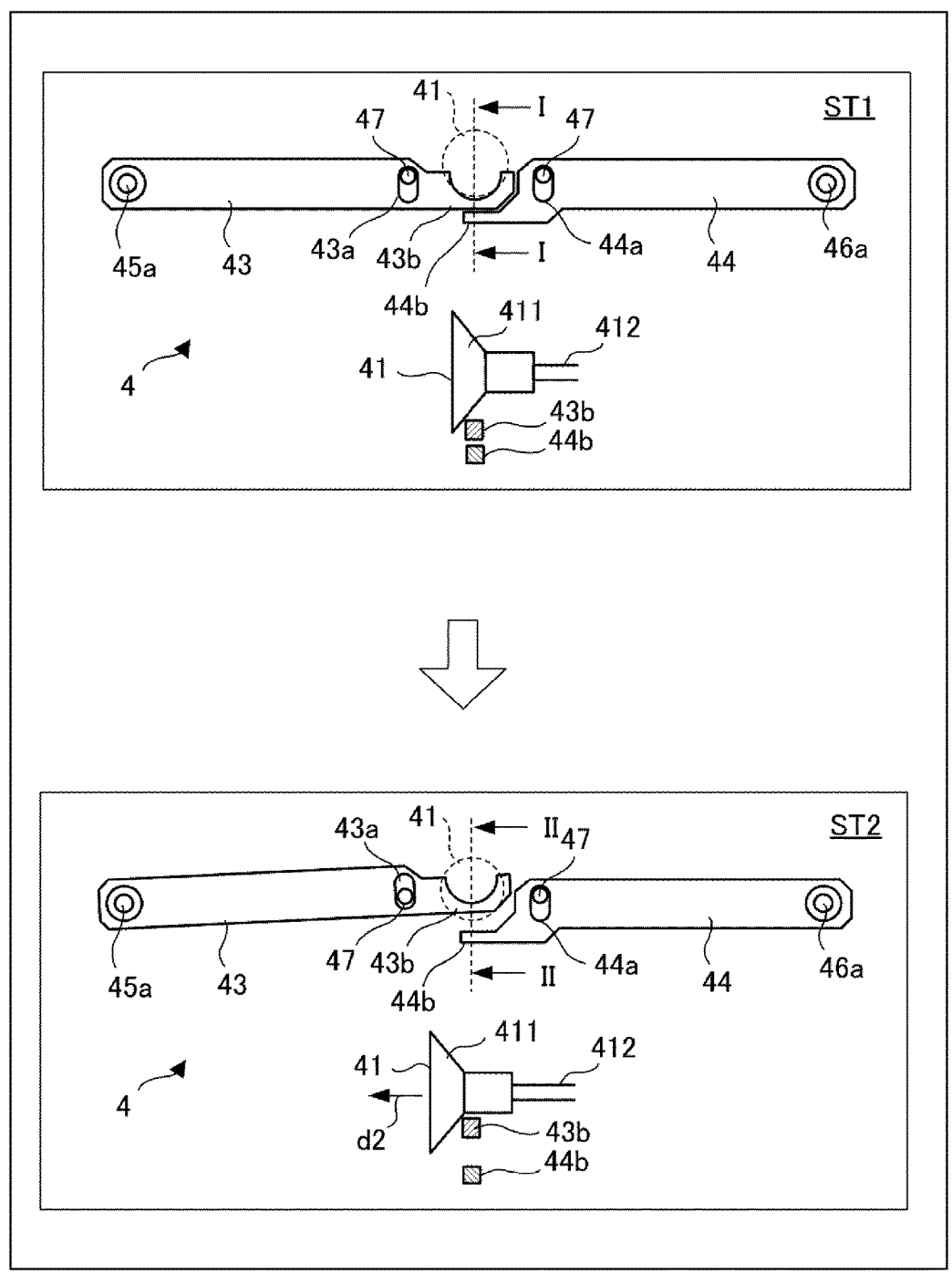

WORK SUPPORT APPARATUS

This application is a continuation of International Patent Application No. PCT/JP2011/003585 filed on Jun. 23, 2011, the entire content of which is incorporated herein by reference.

BACKGROUND OF THE INVENTION

Field of the Invention

The present invention relates to a work support apparatus capable of adjusting the posture of a work.

Description of the Related Art

As a support apparatus for supporting a work like a pallet for an engine when the work is conveyed by a conveyor or the like, there are proposed support apparatuses for holding a work in a cantilevered state (Japanese Patent Laid-Open Nos. 7-41158 and 2006-263860). In the support apparatus that holds a work in the cantilevered state, changing only the portion that holds the work in the cantilevered state suffices when changing the work, and the support apparatus need not wholly be changed.

When performing various kinds of operations such as assembling parts to a work or processing or inspecting it, holding the work with its operation target portion facing the operator is convenient from the viewpoint of operations. To do this, there are also proposed support apparatuses including a tilt mechanism capable of rotating a work about a horizontal axis (Japanese Patent Laid-Open Nos. 2007-203385 and 2010-155307).

To increase the operation efficiency, the operations are preferably performed continuously for many parts of a work. However, the tilt mechanisms described in PLTs 3 and 4 include an axis configured to make the work pivot, and the side portion of the work on the holding side (the side connected to the support apparatus) is closed by the support apparatus. To perform operations for the side portion of the work on the holding side, the work needs to be temporarily detached from the support apparatus, resulting in a decrease in the operation efficiency.

SUMMARY OF THE INVENTION

It is an object of the present invention to enable operations for the side portion of a work on the holding side while enabling tilt of the work.

According to the present invention, there is provided a work support apparatus comprising a base unit, a holding unit that stands on the base unit and holds a work in a cantilevered state, and a tilt mechanism that makes the holding unit pivot with respect to the base unit, wherein the holding unit includes a holding portion that holds the work in a state in which a side portion of the work on a side of the holding unit is exposed, and the tilt mechanism comprises an arcuate slide mechanism comprising an arcuate shape portion that is provided on one of the base unit and the holding unit with respect to a virtual horizontal line as a center, and an abutting portion that is provided on the other of the base unit and the holding unit and abuts against the arcuate shape portion.

BRIEF DESCRIPTION OF THE DRAWINGS

FIG. 5 is an explanatory view of the fixing unit.

DESCRIPTION OF THE EMBODIMENTS

Figure 1:
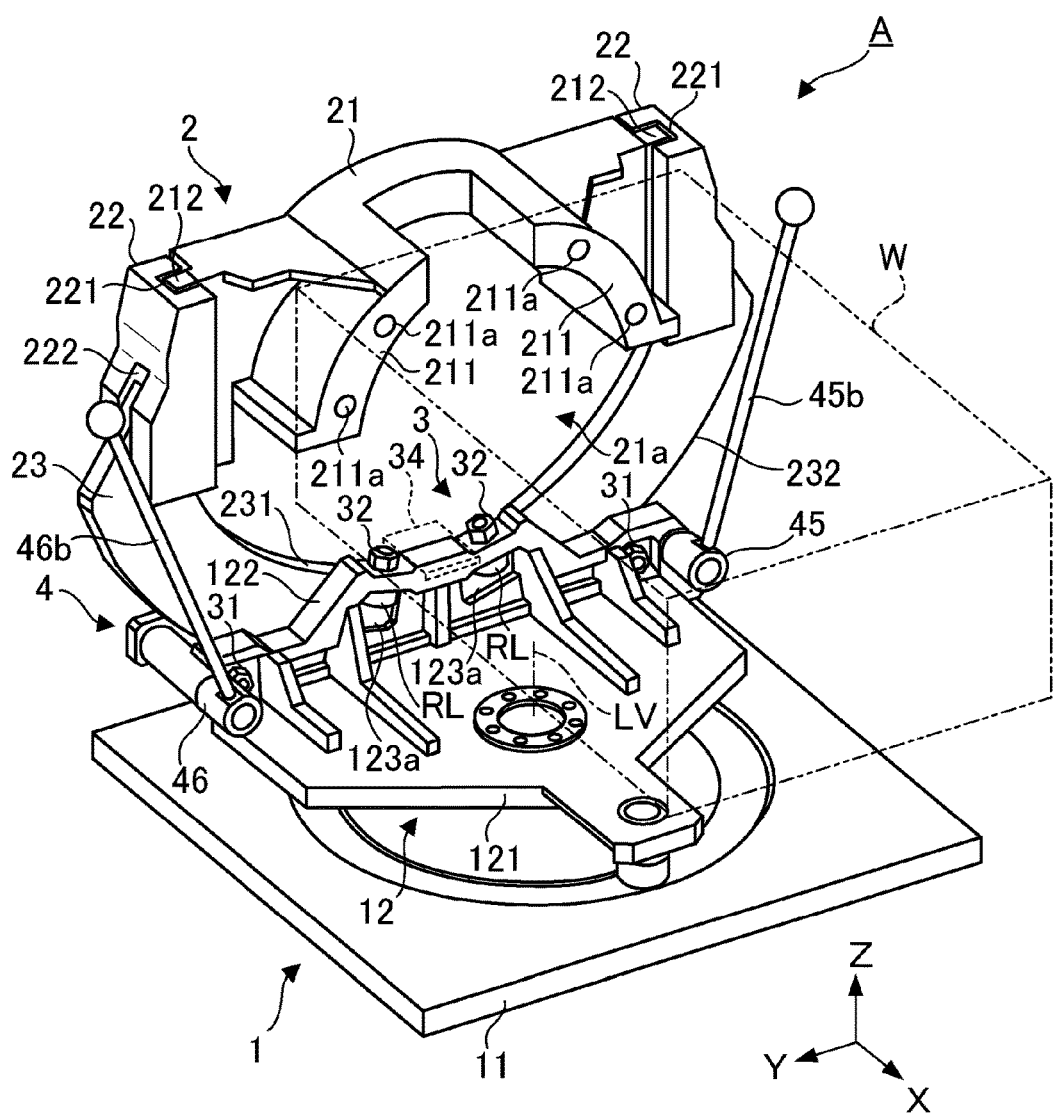
FIG. 1 is a perspective view of a work support apparatus according to an embodiment of the present invention.
Figure 2:
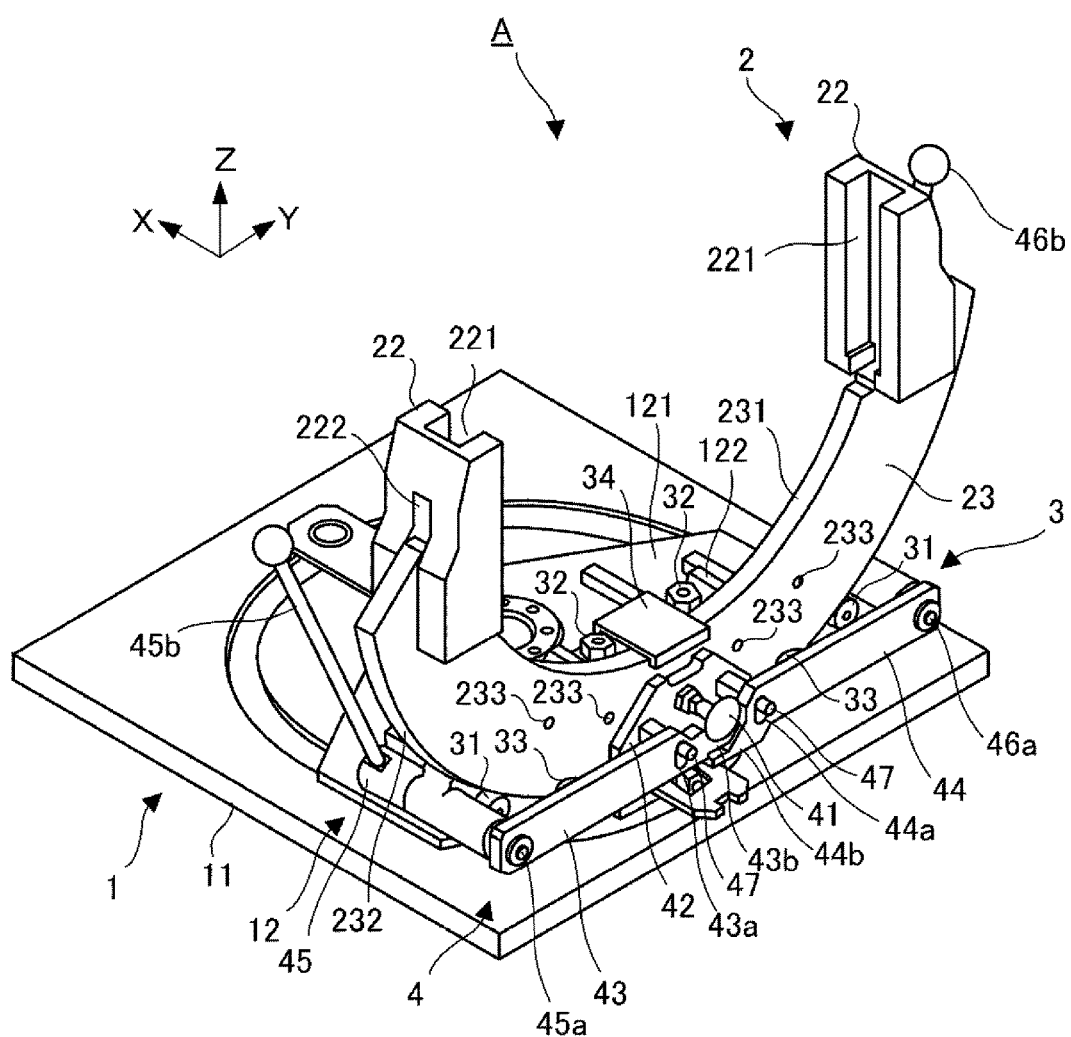
FIG. 2 is a perspective view of the work support apparatus viewed from another direction.

FIG. 1 is a perspective view of a work support apparatus A according to an embodiment of the present invention. FIG. 2 is a perspective view of the work support apparatus A viewed from another direction. Note that in these drawings, an arrow Z indicates an upward/downward direction (vertical direction), and arrows X and Y indicate horizontal directions perpendicularly crossing each other. An elevation regulating member 34 to be described later is illustrated as a see-through part in FIG. 1. FIG. 2 shows a state in which an adapter 21 and a work W to be described later are detached.

The work support apparatus A includes a base unit 1, a holding unit 2, a tilt mechanism 3, and a fixing unit 4.

The base unit 1 includes a main body portion 11 and a turntable portion 12. The main body portion 11 has a plate shape. The turntable portion 12 is supported by the main body portion 11 so as to freely pivot about a line LV (see FIG. 1) that is a vertical axis in the Z direction. Pivotal movement of the turntable portion 12 allows the work W to turn about the vertical axis and implements higher operability. The turntable portion 12 includes a plate-like horizontal portion 121 extending in the horizontal direction, and an upright portion 122 extending upward from the horizontal portion 121.

The holding unit 2 is vertically arranged on the turntable portion 12 and holds the work W in a cantilevered state. The holding unit 2 includes a frame 23 supported by the turntable portion 12, the adapter 21, and connection portions 22 that connect the adapter 21 and the frame 23, and forms a ring-shaped opening portion 21a as a whole.

The adapter 21 includes holding portions 211 each having a side portion to which the work W is connected. Each holding portion 211 has a plurality of attachment holes 211a. The attachment holes 211a are, for example, threaded holes. The side portion of the work W on the side of the holding unit 2 (in this case, the side surface in contact with the holding portions 211) is connected to the holding portions 211 using the attachment holes 211a. The work W is thus held in the cantilevered state.

The holding portions 211 have an arcuate outer shape, and their inner portions and the frame 23 form the above-described opening portion 21a. For this reason, the side portion of the work W on the holding unit side faces (is exposed to) the opening portion 21a except the portions overlapping the holding portions 211 and the like.

The frame 23 is formed from a plate-like member having vertical surfaces (Y-Z plane in FIG. 1), and has an arcuate (ring-like) outer shape. The connection portions 22 are fixed to the two ends of the frame 23, respectively. Each connection portion 22 has a groove 221 to which the adapter 21 is detachably attached, and a groove 222 in which an end of the frame 23 is inserted and fixed.

The grooves 221 extend in the Z direction. The adapter 21 has, at its two ends, slide portions 212 to be inserted/removed into/from the grooves 221. The adapter 21 can detachably be attached to the connection portions 22 in the Z direction. The adapters 21 are prepared in correspondence with the types of the works W. This makes it possible to cope with different types of works W only by exchanging the adapter 21. The adapter 21 can easily be exchanged by making it vertically slide along the connection portions 22.

Figure 3:
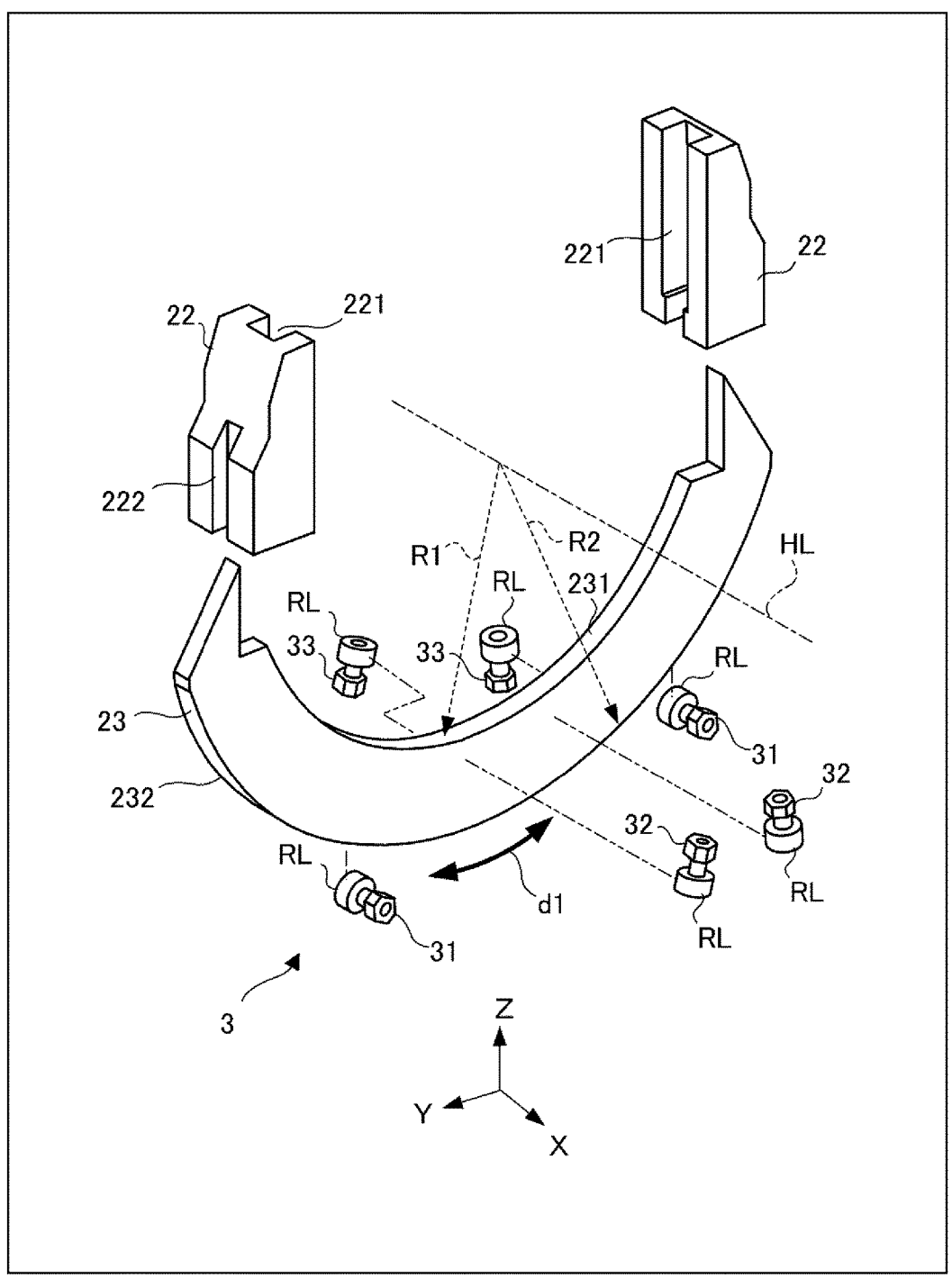
FIG. 3 is an explanatory view of a tilt mechanism.

The structures of the frame 23 and the tilt mechanism 3 will be described with reference to FIG. 3 in addition to FIGS. 1 and 2. FIG. 3 is an explanatory view of the tilt mechanism 3.

The frame 23 includes an arcuate portion. The arcuate portion is part of a ring with respect to a virtual horizontal line HL as the center parallel to the X direction. In other words, the arcuate portion has an arcuate outer shape with respect to the virtual horizontal line HL as the center. In this embodiment, most of the frame 23 forms the arcuate portion except the two ends to which the connection portions 22 are fixed. However, an arcuate portion at least partially provided on the frame suffices. As shown in FIG. 3, an inner edge 231 and an outer edge 232 of the frame 23 form part of the outer surfaces of cylinders having radii R1 and R2 (>R1), respectively, with respect to the virtual horizontal line HL as the center and have an arcuate shape. When the inner edge 231 is formed into an arcuate shape, the opening portion 21a can be made larger. The virtual horizontal line HL is located at a position to pass through the center of the opening portion 21a, and therefore passes through the work W held by the adapter 21.

The tilt mechanism 3 is a mechanism that causes the holding unit 2 to pivot with respect to the base unit 1 (pivot along the Y-Z plane in FIG. 1). The tilt mechanism 3 is an arcuate slide mechanism including the arcuate shape portion 232 and a plurality of abutting portions RL. In this embodiment, the arcuate shape portion 232 is the outer edge 232 of the above-described frame 23. The abutting portions RL are the rollers of cam followers 31 to 33.

The cam followers 31 are fixed on the upright portion 122. The outer surfaces of the rollers RL of the cam followers 31 abut against the arcuate shape portion (outer edge) 232 of the frame 23. The rollers RL of the cam followers 31 are arranged such that their butt points to the arcuate shape portion 232 are located on the outer surface of the cylinder having the radius R2 with respect to the virtual horizontal line HL as the center. The arcuate shape portion 232 and the rollers RL of the cam followers 31 make the holding unit 2 freely pivot in the direction of an arrow d1 on an arcuate orbit with respect to the virtual horizontal line HL as the center.

The cam followers 32 are fixed on the upright portion 122 and arranged such that their rollers RL are located in opening portions 123a (see FIG. 1) formed in the upright portion 122. The opening portions 123a are provided at positions to face the inner edge 231 of one side surface of the frame 23. The outer surfaces of the rollers RL abut against one side surface of the frame 23 at portions on the side of the inner edge 231. The cam followers 32 prevent the frame 23 from falling. In this embodiment, the frame 23 moves on an arcuate orbit. In this embodiment, to make the rotation direction of the rollers RL match the moving direction of the frame 23 and decrease the resistance, the cam followers 32 are arranged while being tilted such that the axes of rotation of the rollers RL pass through the virtual horizontal line HL.

The cam followers 33 are fixed on the horizontal portion 121. The outer surfaces of the rollers RL abut against the other side surface of the frame 23 at portions on the side of the outer edge 232. That is, the rollers RL of the cam followers 33 abut against the side surface opposite to the side surface against which the rollers RL of the cam followers 32 abut. The cam followers 33 also prevent the frame 23 from falling. Like the cam followers 32, to make the rotation direction of the rollers RL match the moving direction of the frame 23 and decrease the resistance, the cam followers 33 are also arranged while being tilted such that the axes of rotation of the rollers RL pass through the virtual horizontal line HL. Note that the elevation regulating member 34 shown in FIGS. 1 and 2 is a member that is fixed on the upright portion 122 and regulates upward movement of the holding unit 2.

As described above, in this embodiment, the cam followers 31 support the frame 23 from below, and the cam followers 32 and 33 sandwich and support the frame 23 from sides, thereby supporting the whole holding unit 2 and making it pivot about the virtual horizontal line HL. The tilt mechanism 3 is formed by combining the six cam followers 31 to 33 and the arcuate shape portion 232 corresponding to the outer edge of the frame 23 that is a plate-like member. It is therefore possible to relatively easily form the tilt mechanism and easily reduce its weight.

Figure 4:
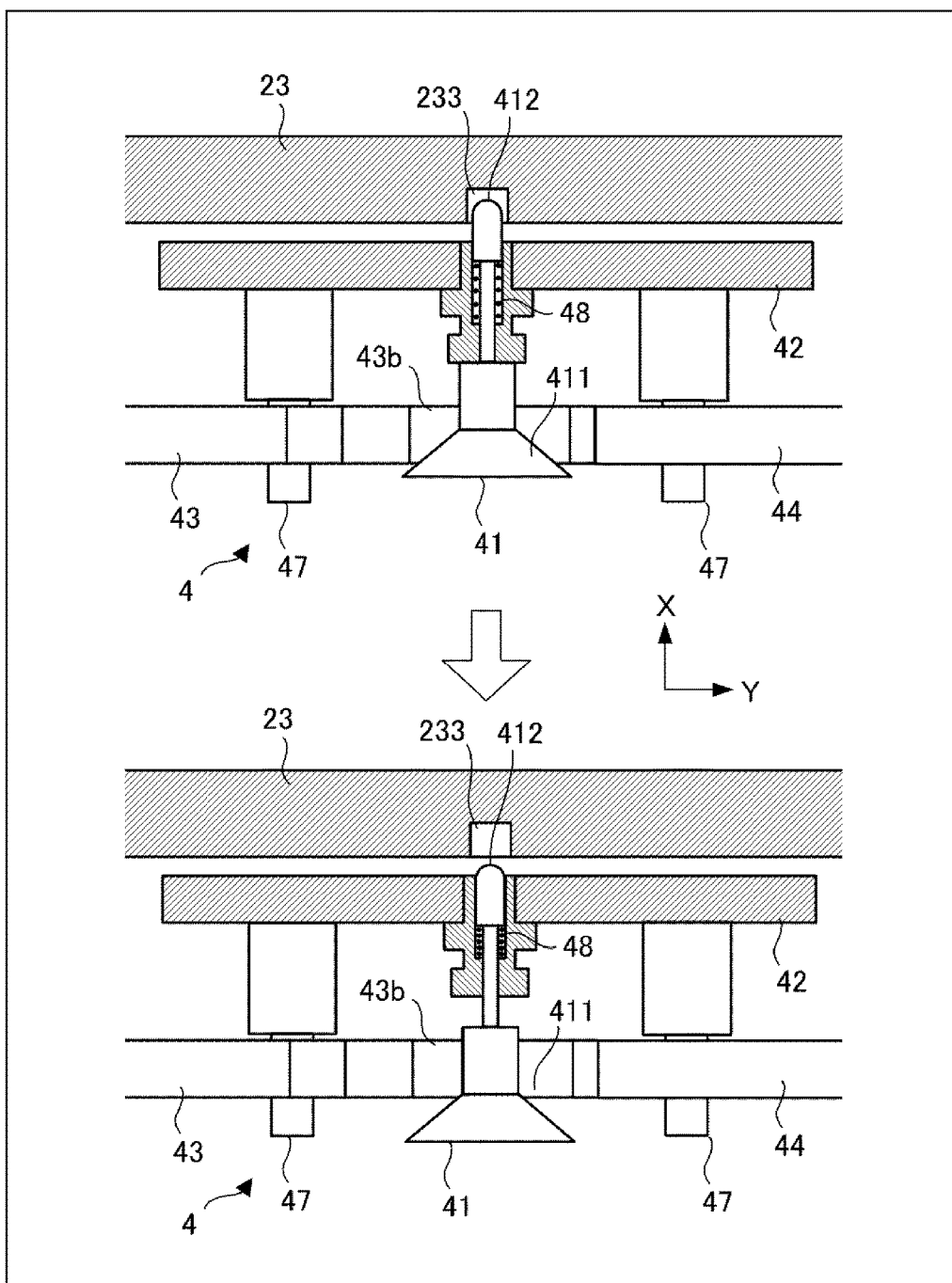
FIG. 4 is an explanatory view of a fixing unit.

The fixing unit 4 will be described next with reference to FIGS. 1, 2, 4, and 5. FIGS. 4 and 5 are explanatory views of the fixing unit 4.

The outline of the arrangement of the fixing unit 4 will be described first with reference to FIGS. 1 and 2. The fixing unit 4 is a mechanism that releasably fixes the holding unit 2 and the base unit 1 at a plurality of tilt angles. The fixing unit 4 includes a regulating member 41, a support member 42 that is attached to the horizontal portion 121 and supports the regulating member 41, arm members 43 and 44 configured to move the regulating member 41 from the regulating position to the release position, and pivotal members 45 and 46 that make the arm members 43 and 44 pivot, respectively.

The regulating member 41 engages with one of a plurality of engaging grooves 233 (FIG. 2) formed in the other side surface of the frame 23 so that the holding unit 2 cannot pivot with respect to the base unit 1. The engaging grooves 233 are located on the same circle with respect to the virtual horizontal line HL as the center. The tilt angle of the holding unit 2 can be selected by selecting the engaging groove 233 to be engaged with the regulating member 41.

FIG. 4 shows a horizontal section near the regulating member 41. The upper view illustrates a state in which the regulating member 41 is located at the regulating position, and the lower view illustrates a state in which the regulating member 41 has moved to the release position. The regulating member 41 coaxially includes a conical portion (abutting portion) 411 and a pin portion 412, and is supported by the support member 42 to be slidable in the X direction. The conical portion 411 continuously makes its diameter large from the columnar portion on the side of the pin portion 412. When the regulating member 41 is located at the regulating position, the pin portion 412 is inserted into the engaging groove 233 and engages with it. When the regulating member 41 is located at the release position, the pin portion 412 is removed from the engaging groove 233 and disengages from it. An elastic member 48 always biases the regulating member 41 to the regulating position. In this embodiment, the elastic member 48 is a coil spring but may be a rubber member or the like.

The regulating member 41 is assumed to be moved between the regulating position and the release position by manually operating operation levers 45b and 46b. In particular, the regulating member 41 is moved from the regulating position to the release position using a mechanism that makes the arm members 43 and 44 pivot. This point will be described below in detail.

Referring to FIGS. 1 and 2, the pivotal members 45 and 46 are pivotally supported by the upright portion 122 about pivotal centers in the X direction. The pivotal members 45 and 46 have the operation levers 45*b* and 46*b* to be operated by the operator, respectively.

Ends 45*a* and 46*a* of the pivotal members 45 and 46 are fixed to the arm members 43 and 44, respectively. When the operation levers 45*b* and 46*b* are operated to make the pivotal members 45 and 46 pivot in directions to move away from each other (clockwise and counterclockwise in FIG. 1) about the pivotal centers in the X direction, the arm members 43 and 44 pivot.

The arm members 43 and 44 respectively have long holes 43*a* and 44*a* that are long in the upward/downward direction (Z-axis direction) on the side opposite to the side on which the ends 45*a* and 46*a* of the pivotal members 45 and 46 are fixed. Pins 47 supported by the support member 42 are inserted into the long holes 43*a* and 44*a* to regulate the pivotal ranges of the arm members 43 and 44, respectively.

The arrangement of the arm members 43 and 44 will be described in more detail with reference to FIG. 5. The upper view (state ST1) of FIG. 5 indicates a case in which the arm member 43 is located at the initial position, and illustrates a section taken along a line I-I together. The lower view (state ST2) of FIG. 5 indicates a case in which the arm member 43 is located at the operation position, and illustrates a section taken along a line II-II together.

Operating portions 43*b* and 44*b* are formed at the ends of the arm members 43 and 44 on the side of the regulating member 41, respectively. The operating portion 43*b* is located under the conical portion 411 of the regulating member 41, and has a semicircularly cut shape on the upper side. The operating portion 44*b* overlaps the operating portion 43*b* in the Z direction, and is located under the operating portion 43*b*.

The state ST1 indicates a case in which the regulating member 41 is located at the regulating position. The operating portion 43*b* is located under the conical portion 411. The state ST2 indicates a state in which the operator has operated the operation lever 45*b* to make the arm member 43 pivot. When the arm member 43 pivots, the operating portion 43*b* rises. Accordingly, the butt position between the operating portion 43*b* and the conical portion 411 moves toward the pin portion 412 to apply a force in the direction of an arrow d2 to the regulating member 41. The regulating member 41 thus moves to the release position.

An example in which only the arm member 43 is made to pivot has been described with reference to FIG. 5. Since the operating portion 43*b* intervenes between the conical portion 411 and the operating portion 44*b*, when the operator operates the operation lever 46*b* to make the arm member 44 pivot, the arm member 43 pivots to obtain the same state as described with reference to FIG. 5, and the regulating member 41 moves to the release position. Hence, the regulating member 41 can be moved from the regulating position to the release position by operating any one of the operation levers 45*b* and 46*b*. However, when both the operation levers 45*b* and 46*b* are operated, the regulating member 41 can be moved by a larger force from the regulating position to the release position.

After moving the regulating member 41 to the release position, the operator manually makes the holding unit 2 or the work W pivot to near the target tilt angle and returns the operation levers 45*b* and 46*b* to the initial positions. At this time, the tip of the pin portion 412 of the regulating member 41 is butting against the other side surface of the frame 23. When the operator further manually makes the holding unit 2 or the work W pivot, and the pin portion 412 comes onto the engaging groove 233, they engage with each other due to the bias of the elastic member 48. The holding unit 2 and the base unit 1 are thus fixed at the tilt angle desired by the operator. Since the elastic member 48 is provided to always bias the regulating member 41 to the regulating position, the pin portion 412 can engage with the desired engaging groove 233 even when the operator does not accurately align them.

In the work support apparatus A having the above-described arrangement, the work W as the operation target is held by the holding unit 2, as shown in FIG. 1, and operations for the work W can be performed. The tilt mechanism 3 can tilt the holding unit 2. For this reason, when performing operations for different portions (side portion, back side portion, and the like) of the work W, the work W can be tilted to change its posture and make the operation target portion face the operator for the operations. In addition, the tilt mechanism 3 is an axial arcuate slide mechanism. Since the work W is held with its side portion on the holding side exposed, operations for the work W can be performed via the opening portion 21*a* of the holding unit 2. In particular, the workspace can be ensured around the pivotal center (virtual horizontal line HL) when tilting the work W.

Figure 6:
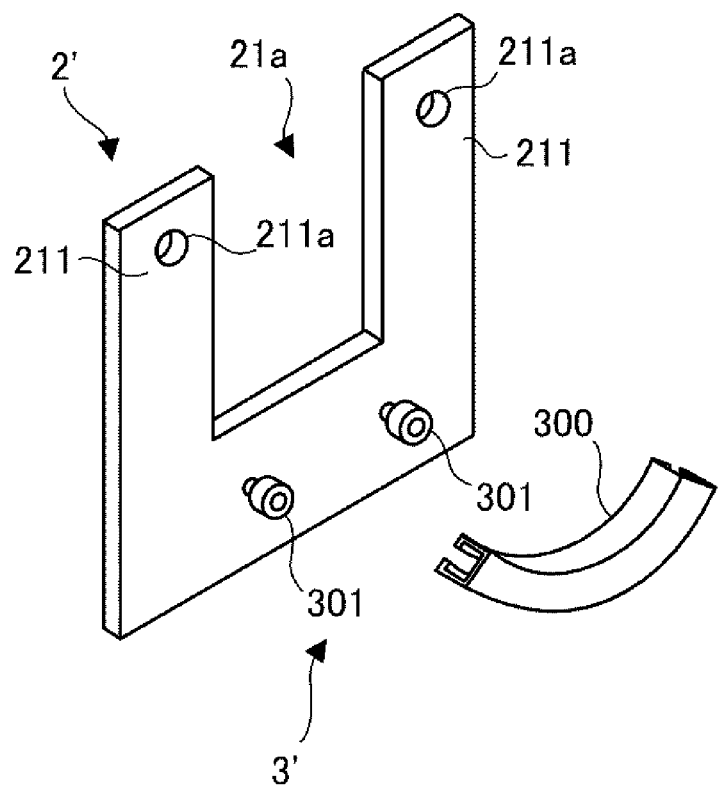
FIG. 6 is an explanatory view of another example of the tilt mechanism.

Note that the arcuate shape portion 232 is provided on the holding unit 2, and the abutting portions RL are provided on the base unit 1 as the tilt mechanism 3 in this embodiment, the parts may be interchanged. FIG. 6 shows an example of a tilt mechanism 3' that is another example of the tilt mechanism 3.

In the example shown in FIG. 6, a holding unit 2' that replaces the holding unit 2 is a U-shaped plate member and has the opening portion 21*a* at its center. The portions on both sides of the opening portion 21*a* serve as the holding portions 211 in which the attachment holes 211*a* are formed. Abutting portions 301 are attached on the lower side of the opening portion 21*a*. The abutting portions 301 are rollers.

An arcuate shape portion 300 is provided on a base unit that is not illustrated in FIG. 6. The arcuate shape portion 300 is an arcuate rail member having a C-shaped section. The arcuate shape portion 300 stores the abutting portions 301 inside and rolls.

In the tilt mechanism 3 having the above-described arrangement, the holding unit 2 is supported by the base unit 1 via the arcuate shape portion 300 and pivots when the abutting portions 301 are guided by the arcuate shape portion 300. As described above, either the holding unit 2 or the base unit 1 can have the arcuate portion (232 or 300) or the abutting portions (RL or 301). In the above-described examples, the abutting portions (RL and 301) are rollers. However, the abutting portions need not always be rotation members such as rollers and may be members that slidably move the arcuate portion (232 or 300). However, rollers can implement smooth pivot.

What is claimed is:

1. A work support apparatus which supports a work and pivots the work about a horizontal axis, comprising:
   a base unit;
   a holding unit that holds an end portion, in an axis direction of the horizontal axis, of the work in a cantilevered state; and
   a tilt mechanism that makes said holding unit pivot about the horizontal axis with respect to said base unit,
   wherein said holding unit includes:
   an adapter that is attached to the work and has a holding portion that holds the work in the cantilevered state in which the end portion of the work is exposed;

a frame which said tilt mechanism makes pivot about the horizontal axis; and a connection portion that detachably connects said adapter and said frame, said holding unit, in which said adapter and said frame are connected with each other through said connection portion, includes an opening portion at a center thereof, said holding unit holds the end portion of the work in a state that the end portion, except for a portion which overlaps with said holding portion of said adapter, faces the opening portion, and in said holding unit, only said adapter, via the holding portion, is directly connected with the work.

2. The work support apparatus according to claim 1, wherein-said connection portion comprises two connection portions, each of said two connection portions includes a first connecting portion and a second connecting portion, said frame has an arcuate outer shape, said adapter has an arcuate outer shape, first connecting portions of said two connection portions are connected to both ends of said frame, respectively, and second connecting portions of said two connection portions are connected to both ends of said adapter, respectively.

3. The work support apparatus according to claim 2, wherein said tilt mechanism comprises an arcuate slide mechanism comprising:

an arcuate shape portion that is provided on one of said base unit and said holding unit with respect to a virtual horizontal line as a center; and an abutting portion that is provided on the other of said base unit and said holding unit and abuts against said arcuate shape portion, and said abutting portion comprises a plurality of first rollers that abut against said arcuate shape portion.

4. The work support apparatus according to claim 3, wherein said abutting portion further comprises:

a plurality of second rollers that are provided on said base unit and abut against one surface and the other surface of said frame, respectively, said one surface of said frame is a surface at a side in which the work is held in the cantilevered state, said other surface of said frame is a surface at a side opposed to the side in which the work is held in the cantilevered state, and rollers among said plurality of rollers, which abut against said one surface of said frame, abut against portions on a side of an inner edge of said frame.

5. The work support apparatus according to claim 1, further comprising a fixing unit that releasably fixes said frame and said base unit at a plurality of tilt angles.

6. The work support apparatus according to claim 1, wherein said base unit comprises:

a turntable portion on which said holding unit stands; and a main body portion that supports said turntable portion pivotally about a vertical axis.

7. The work support apparatus according to claim 1, wherein said frame comprises a first arcuate outer shape member, said adapter comprises a second arcuate outer shape member, said connection portion comprises a first connecting portion and a second connecting portion, said first connecting portion detachably connects one end of said first arcuate outer shape member and one end of said second arcuate outer shape member, said second connecting portion detachably connects another end of said first arcuate outer shape member and another end of said second arcuate outer shape member, and the opening has a circular shape.

8. The work support apparatus according to claim 1, wherein said adapter includes one end and another end which are spaced apart from each other in a direction of the horizontal axis, said holding portion is provided with said one end of said adapter, and said connection portion is provided with said another end of said adapter.

9. The work support apparatus according to claim 1, wherein said holding portion is apart from the opening portion in a direction of the horizontal axis.

10. The work support apparatus according to claim 1, wherein said holding portion is apart from said frame in a direction of the horizontal axis.

11. The work support apparatus according to claim 1, wherein said holding portion is apart from said connection portion in a direction of the horizontal axis.

12. The work support apparatus according to claim 1, wherein said holding portion is outwardly apart from the opening portion.

13. The work support apparatus according to claim 1, wherein said adapter is slidably attachable and detachable to said connection portion.

* * * * *